Dec. 20, 1932.  C. I. FRANTZ  1,891,805
BRAKE
Filed March 17, 1932   5 Sheets-Sheet 1
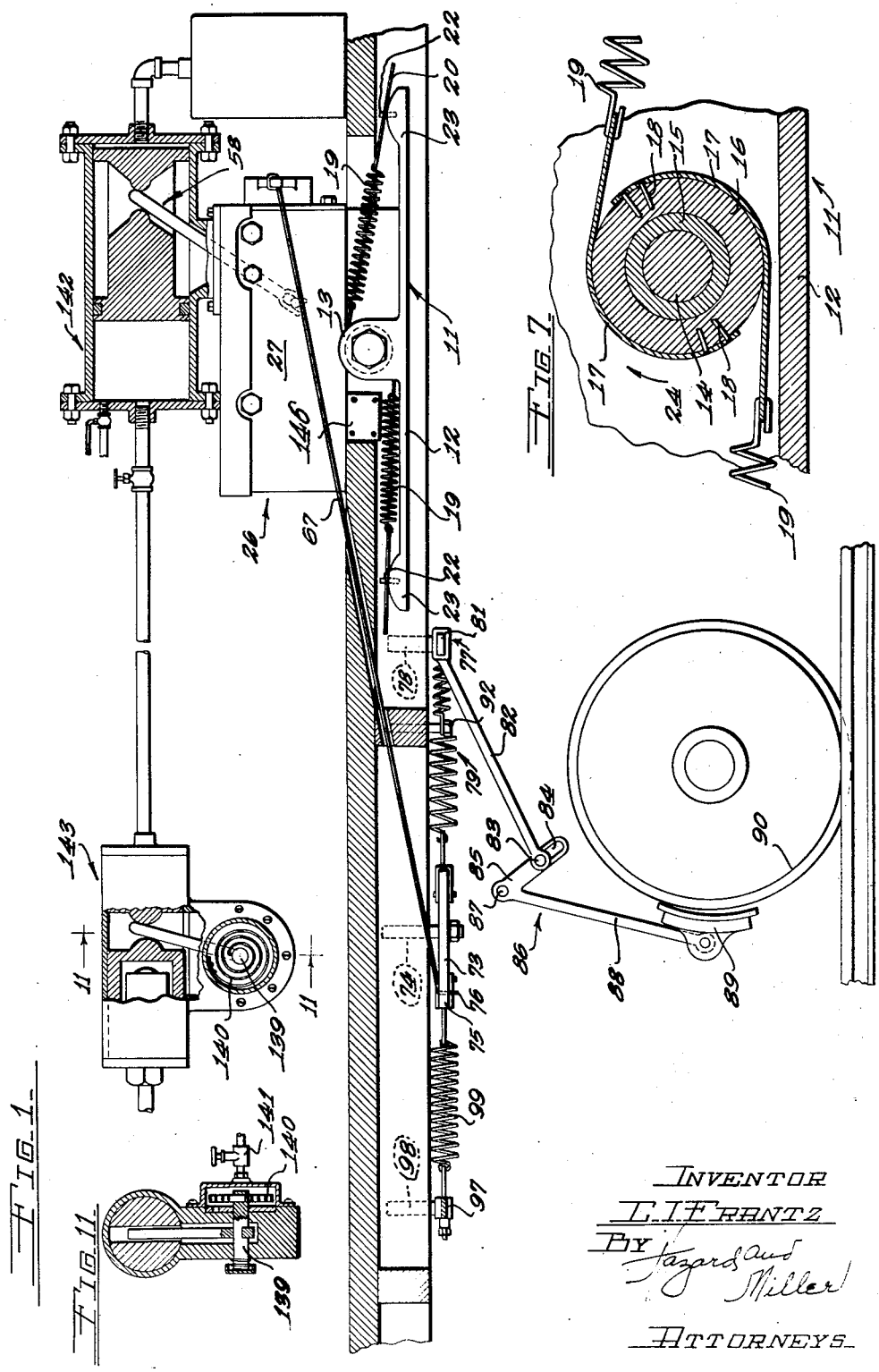
INVENTOR
C. I. Frantz
By Hazard and Miller
ATTORNEYS Dec. 20, 1932.                C. I. FRANTZ                1,891,805
                                  BRAKE
                          Filed March 17, 1932         5 Sheets-Sheet 2
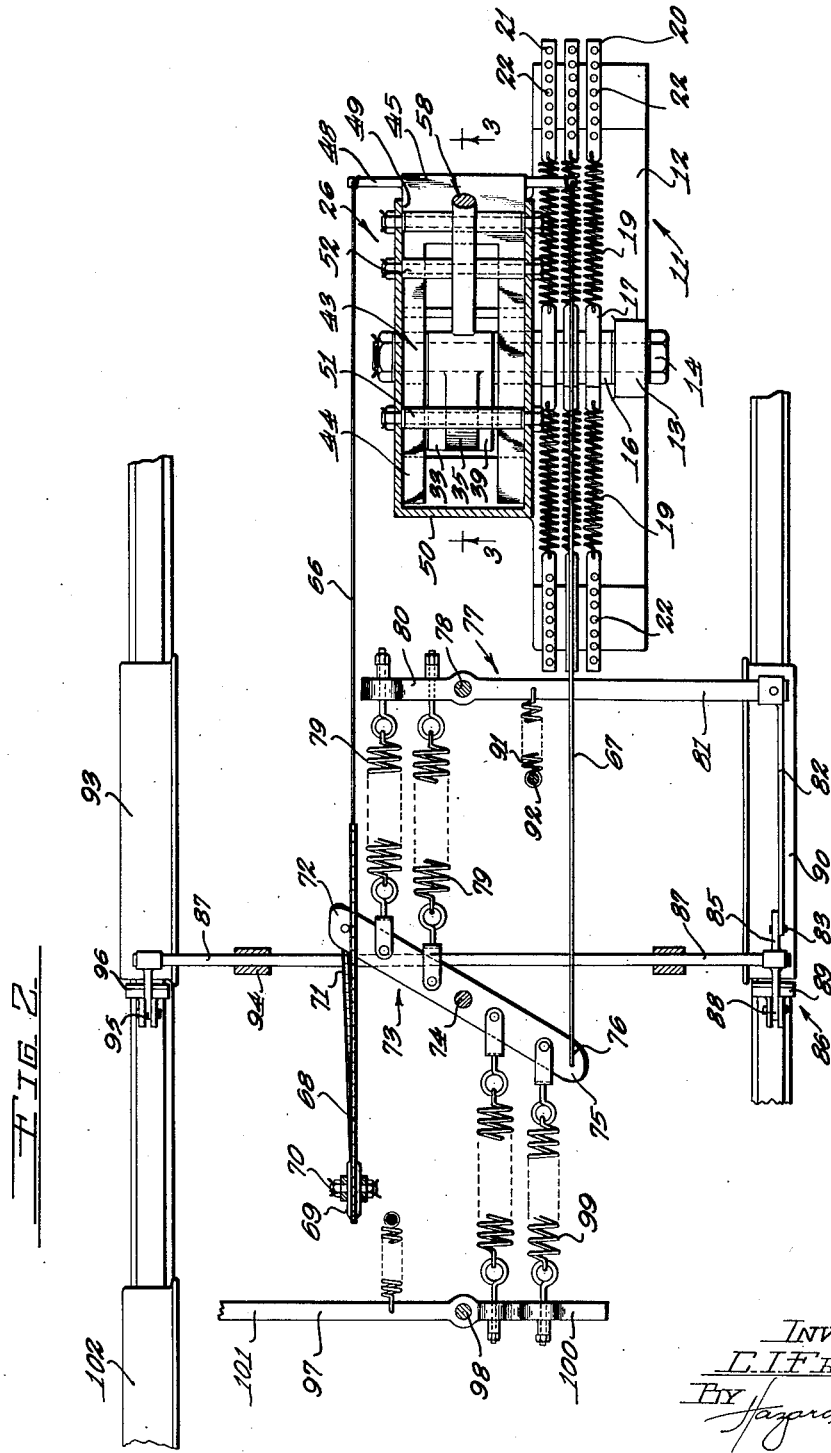

Dec. 20, 1932.   C. I. FRANTZ   1,891,805
BRAKE
Filed March 17, 1932    5 Sheets-Sheet 3
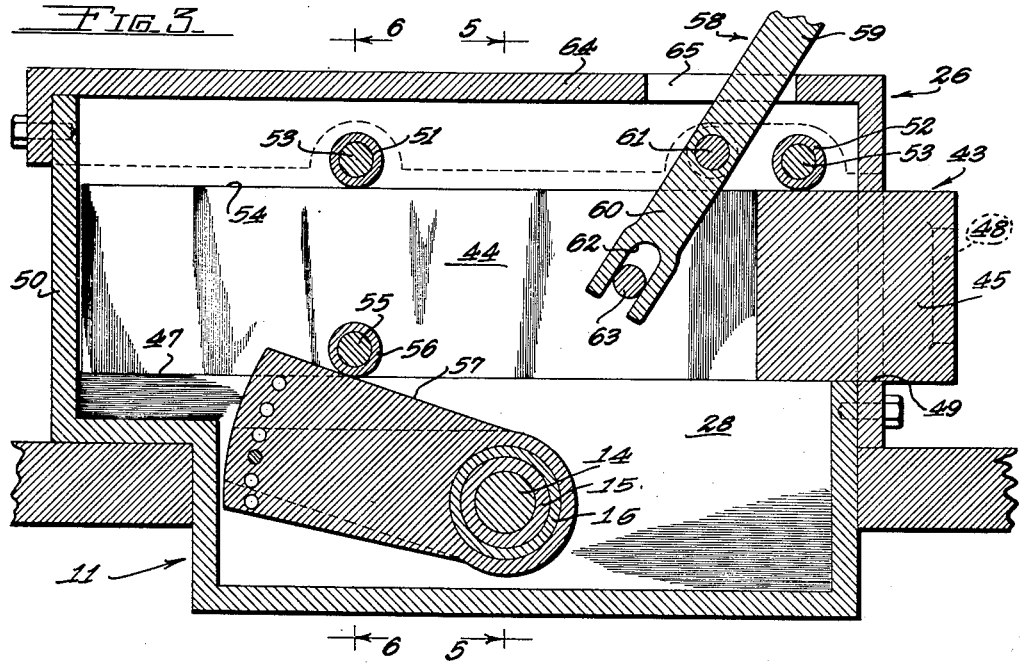
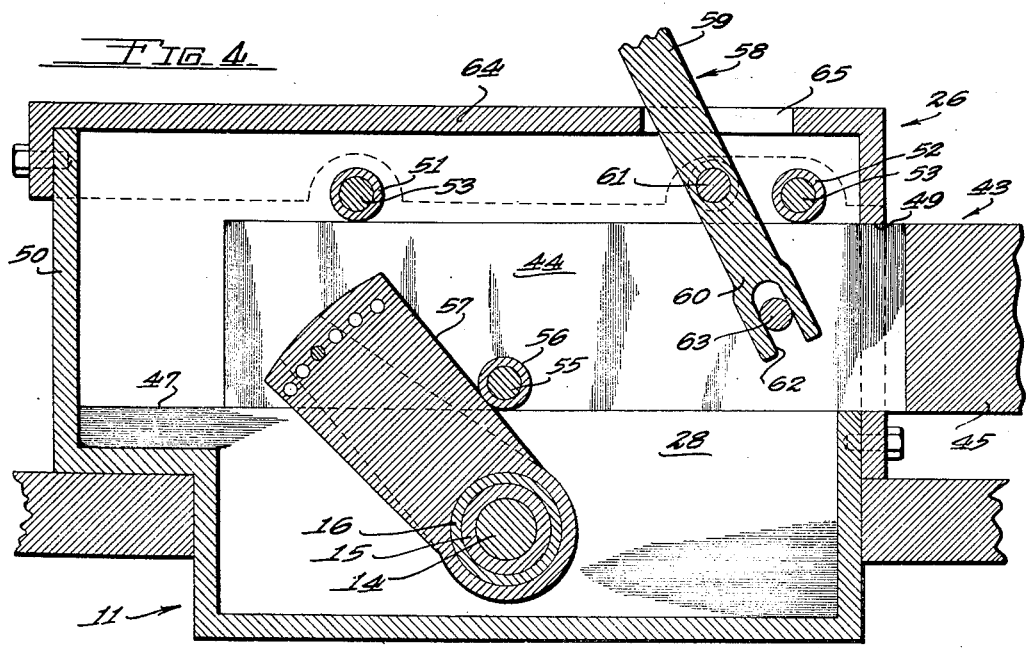
INVENTOR
C. I. FRANTZ
BY Hazard and Miller
ATTORNEYS

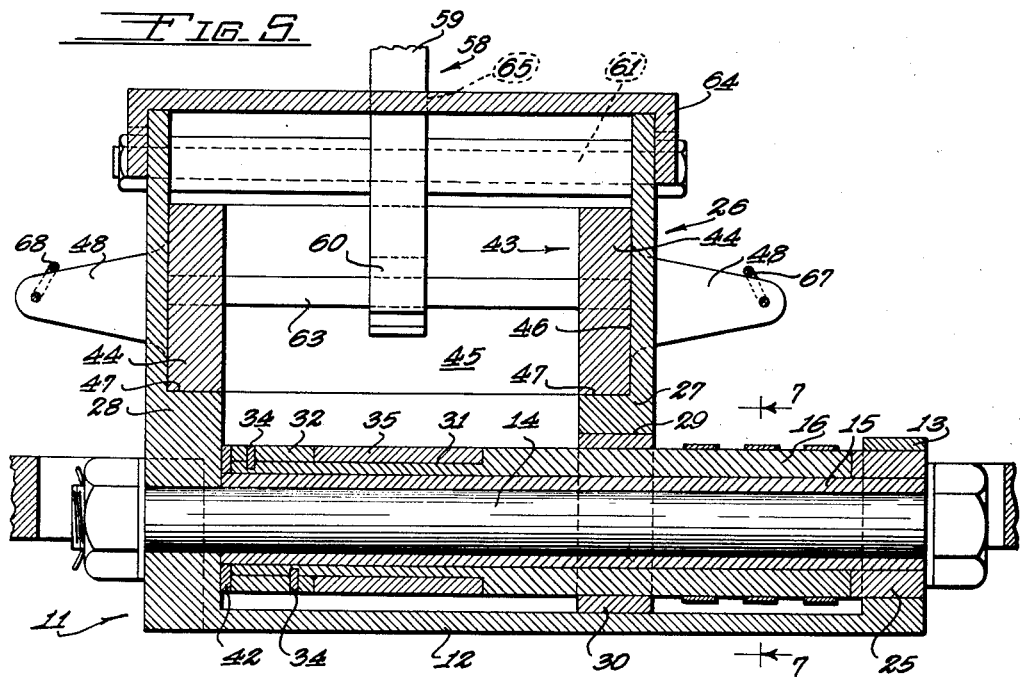
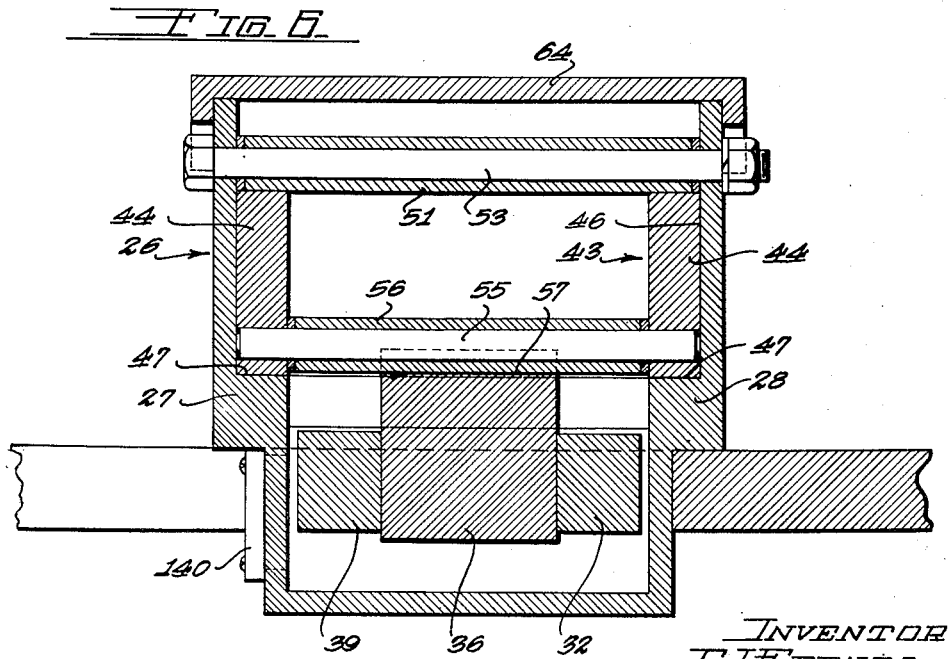

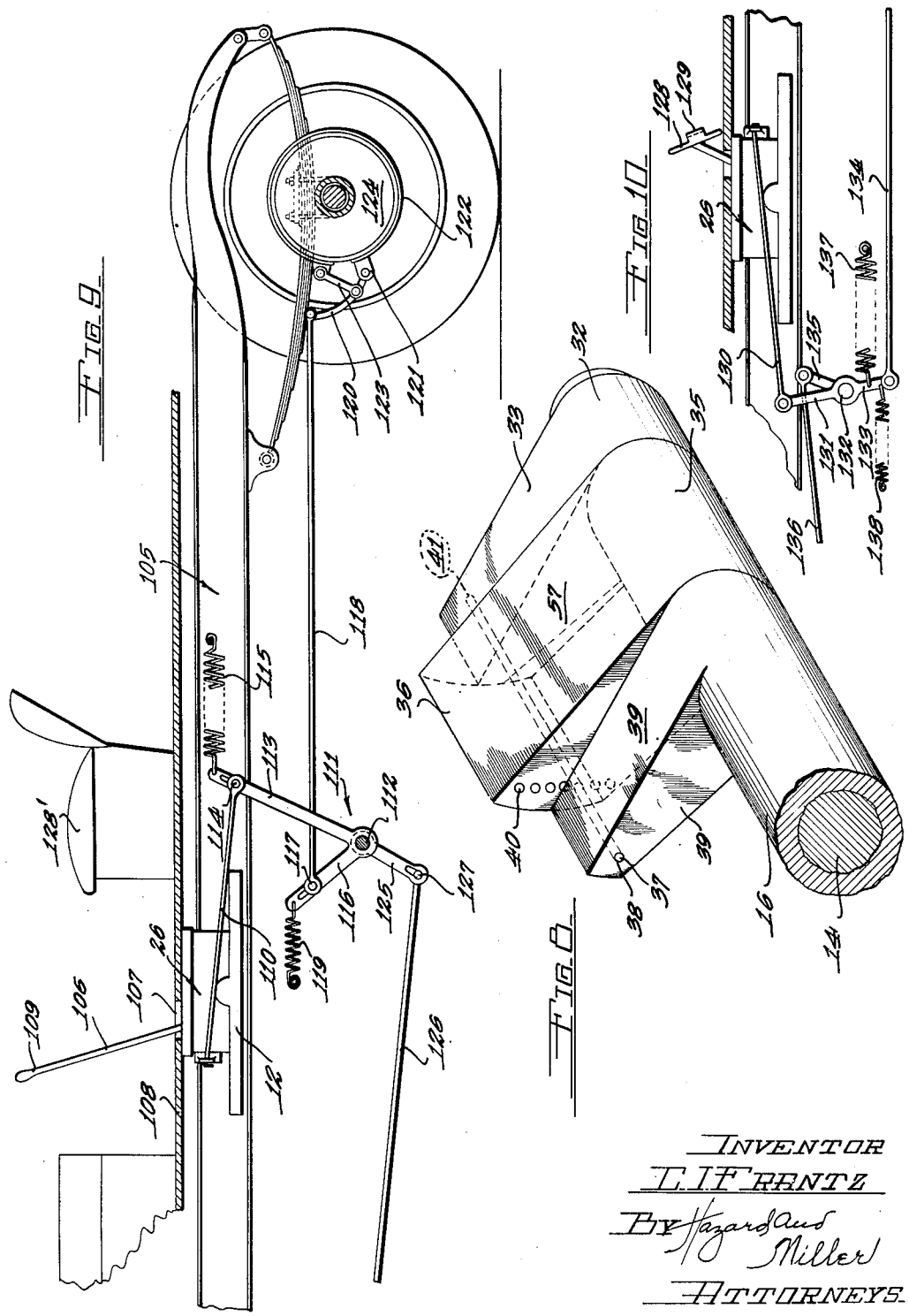

Patented Dec. 20, 1932

1,891,805

UNITED STATES PATENT OFFICE

CRUTHERS I. FRANTZ, OF LOS ANGELES, CALIFORNIA, ASSIGNOR OF ONE-HALF TO PAUL A. FRANTZ, OF SAN FRANCISCO, CALIFORNIA

BRAKE

Application filed March 17, 1932. Serial No. 599,446.

My invention relates to a brake of a type in which a main spring motor together with counter spring motors are used to actuate the release and the application of brakes.

In this type of brake appliance an object and feature of my invention is the construction and utilization of a main spring motor which is connected with actuating mechanism and what might be termed a secondary spring motor or spring appliance connected to the brake mechanism. By this appliance when the main spring motor is fully under tension, that is, in the wound-up position, the brakes are fully released and the secondary springs are in a released condition, and the brakes are held in the released position; and vice versa, when the brakes are applied the main spring motor is in its released or partly released condition and the secondary springs are under increased tension. With this type of brake actuating and semi-balancing mechanism I employ a power transmitting system and control employing a main rotary shaft connected to the main spring motor, such shaft, through a system of lever action and wedges, operating a reciprocating slide bar, and such slide bar, through the medium of links and levers, is connected to the secondary spring system. The secondary spring system is then connected to the actuating levers, links, or bars, which operate the brake shoes or brake bands, as the case may be.

A further object and feature of my invention is the employment in connection with the main spring motor of a rotary shaft, the springs of this motor being connected to the shaft in such a manner that they are tensioned or stressed to rotate the shaft in one direction, and when such shaft is moved to its limit in one position for releasing the brakes the springs of the motor are fully tensioned. Then when it is desired to apply the brakes the springs of the main motor become partly released, the shaft controlled by these brakes being rotated in an opposite direction, and the brakes applied through the secondary system of springs, which latter are brought under tension when the brakes are applied to the wheel.

A further object and feature of my invention is controlling and forcing the rotation of the main shaft of the main motor by a suitable control and actuating mechanism whereby the springs of the main motor are tensioned or released at will. The rotation of the main shaft operates on a power transmitting mechanism, which, on the tensioning of the springs of the main motor releases the auxiliary springs; and vice versa, on the release of the tensioning of the springs of the main motor the auxiliary springs are brought under increased tension.

Another feature of my invention relates to the power transmission mechanism. This employs a sliding bar or block which is mounted to have rectilinear motion and is actuated in this motion by the rotation of the main or power shaft of the main spring motor. The mechanism for operating the reciprocating block, which may be termed a crosshead, is by means of an arm connected to the main shaft, this arm having a wedge formed thereon, and the wedge acting on one or more rollers on the sliding crosshead or block. A link connection is made from the crosshead to the secondary spring system whereby when the main shaft is rotated in one direction to tension the springs of the main motor for release of the brakes, the crosshead block is pulled by the tensioned secondary springs to the position which the crosshead block occupies when the springs are released. Then, when the main shaft is rotated in a direction for setting the brakes, this direction being such as to relieve the tension on the springs of the main motor, the wedging arm operating on the roller of the crosshead block forces this in such a position to exert a pull on the links. The pull on these links increases the tension on the secondary springs, and such secondary springs are connected by any suitable mechanism with the brake shoes, whereby the tension on the secondary springs causes the direct application of the brake shoes to the wheel.

A further object of my invention is the providing of a balance and a means for tensioning the springs of the main motor relative to the secondary springs so that a partial balance is obtained whereby the brakes may readily be held with any desired degree of pressure on the wheels and maintained with such pressure for an indefinite period. This pressure may be increased or released by rocking the main shaft in one direction or the other, the action of increasing the pressure of the brake shoes or bands on the wheel or drum operating to release or decrease the tension of the springs of the main motor and to increase the tension of the secondary springs. Vice versa, the rotation of the shaft in such a direction as to release the pressure of the brake shoes on the wheel or brake bands on a brake drum operates to increase the tension of the springs of the main motor and to decrease the tension of the secondary springs.

My invention is illustrated in connection with the accompanying drawings, in which:

Fig. 1 is a longitudinal section through a vehicle, showing my brake applying apparatus mainly in elevation with certain parts broken away.

Fig. 2 is a plan omitting the power actuating devices and showing part of the covers broken away to illustrate the interior details.

Fig. 3 is a longitudinal vertical section on the line 3—3 of Fig. 2 in the direction of the arrows, showing the slide block or crosshead and associated details, in the brake releasing position.

Fig. 4 is a section similar to Fig. 3 in the brake applying position.

Fig. 5 is a vertical longitudinal section on the line 5—5 of Fig. 3 in the direction of the arrows, showing part of the spring motor and its shaft.

Fig. 6 is a transverse section on the line 6—6 of Fig. 3 in the direction of the arrows.

Fig. 7 is a vertical transverse section on the line 7—7 of Fig. 3 in the direction of the arrows.

Fig. 8 is a perspective view of the adjustable rotating wedge for operating the crosshead.

Fig. 9 is a longitudinal section of a motor vehicle, showing my invention installed therein.

Fig. 10 is a longitudinal section of a modified construction of my brake for a motor vehicle.

Fig. 11 is a section on the line 11—11 of Fig. 1 in the direction of the arrows, through a control valve.

The main spring motor of my invention designated generally by the numeral 11 has a substantial metal base plate 12 with journal lugs 13 therein, in which is mounted the main stationary shaft 14, and on this shaft there is an elongated bushing 15, on which bushing there is rotatably mounted a sleeve 16. This sleeve has a series of flexible straps 17 secured thereto, as indicated at 18. Each of these straps is connected to a spring 19. These springs at their opposite ends have tensioning straps 20, such latter straps having a series of perforations 21, which latter perforations are adapted to engage tensioning pins 22 mounted on projections 23 at each end of the base 12. By this construction, pulling on the straps 20 allows a greater tension to be put on the springs 19, and by engaging the pins 22 in the perforations 21, the springs may be initially set at any suitable desired tension. The springs, when under tension, exert a pull to rotate the sleeve in the direction of the arrow 24 (note Fig. 7). A filler washer 25 fits in the journal lug 13 around the bushing 15. The opening accommodating this allows insertion of the sleeve 16.

The construction of the spring motor transmission and the control device thereof is as follows, having reference particularly to Figs. 1 to 4: A boxlike casing structure 26 is formed with the base 12 forming the bottom of the box. This box has an outside wall 27 and an inside wall 28, the shaft 14 being mounted in the wall 28. The wall 27 has an opening 29 through which extends the shaft 14, the bushing 15, and the sleeve 16, there being a filler collar 30 surrounding the sleeve. The sleeve 16 has a reduced section 31, and on the inner end of this there is mounted a collar 32 with a radial arm 33. This collar is keyed or pinned as indicated at 34 to the reduced section 31 of the sleeve 16. An adjustable collar 35 is mounted on the reduced section 31 and has an adjustable radial wedging arm 36 formed integral therewith. This arm and its collar is rotatable on reduced section 31. When adjusted, the wedge arm 36 is held in place by means of a pin 37 which extends through a perforation 38 in a radial arm 39 extending laterally from the sleeve 16 inside of the wall 27. This pin then extends through any one of a series of perforations 40 placed adjacent the outer end of the adjustable wedging arm 36. The pin also fits in a perforation 41 in the radial arm 33. A washer 42 mounted on the bushing 15 is for the purpose of receiving the wear of the motion of the arm 33 adjacent the back wall 28. By this construction, as the sleeve 16 is rotated by the springs 19 of the main spring motor, a rocking motion is given to the arms 33 and 39 and, hence, through the medium of the pin 37, to the central radial wedging arm 36.

The sliding lock or crosshead designated generally by 43 has two bars 44 and a head piece 45. The bars fit in side recesses 46 in the side walls 27 and 28, and have a sliding bearing on the horizontal shoulders 47. A pair of cross arms 48 are secured to the head 45, which head extends through the open end 49 of the box structure 26, the opposite end 50 being closed by an end plate. A pair of rollers 51 and 52 are each mounted on pins 53 which extend from side to side of the box 26. Such rollers engage the upper surface 54 of the arms and the head of the crosshead and hold this in place on its seat or shoulders 47.

A pin 55 connects the arms 44 of the crosshead, and on this there is mounted a roller 56 which bears on the upper surface 57 of the adjustable wedge arm 36. The control means for reciprocating the crosshead comprises an operation lever 58. This has an upper end 59 and a lower end 60 oscillating on the pivot pin 61 which extends between the sides 27 and 28 of the box 26. The lower end of this lever has a longitudinal slot 62 in which fits a pin 63, this latter extending between the arms 44 of the crosshead. Therefore, when the lever 58 is rocked in one direction, that is, into the position shown in Figs. 1 and 3, the crosshead is moved inwardly in the box 26, causing the roller 56 to roll outwardly on the surface 57 of the wedge arm and force this in a downward direction and along a crosswise direction relative to Fig. 3. This action rotates the sleeve 16 and winds the strap 17 along such sleeve, thus tensioning or winding up the springs 19 of the main motor. When the arm 59 is rocked in the opposite direction, the crosshead is moved partly out of the box and the spring tension operating on the sleeve 16 rotates this sleeve and, hence, the wedge arm 36, causing this arm to follow up and to exert a pressure on the roller 56 and, hence, the tension of the springs of the main motor operates as these release to force the crosshead outwardly. A cover plate 64 fits over the top of the box and has an elongated slot 65 through which the lever 58 operates.

The brake applying mechanism, illustrated in Figs. 1 and 2, employs tension links 66 and 67 which are secured to the cross arms 48 of the crosshead. The link 66 has a chain or cable 68 which extends around a pulley 69, this having a fixed axle 70. The free end 71 of this cable is connected to one end 72 of a balanced lever 73. This lever is pivoted on a fixed vertical pin 74 secured to the vehicle, and the opposite end 75 of this lever is connected to the free end 76 of the link 67.

A brake applying lever 77 is illustrated as pivoted on a vertical pivot pin 78 secured to a fixed part of the vehicle, and a series of springs 79 connect between the end portion 72 of the lever 73 to the short end 80. The long end 81 is illustrated as connected to a link 82, which link has a pin 83 operating in a slot 84 in the short arm 85 of the bell crank 86. This bell crank rotates a rock shaft 87. The long arm 88 of the bell crank is pivotally connected to a brake shoe 89 which operates on the rim of the wheel 90. A counterbalancing spring 91 is connected to the long arm 81 of the lever 77 and to a fixed pin 92 attached to the vehicle.

A wheel 93 on the opposite side of the vehicle is braked through the medium of the rock shaft 87, which is rotatable in journals 94 secured to a fixed part of the vehicle. A rock arm 95 is connected to the free end of this rock shaft and this has a brake shoe 96 attached thereto.

A second brake lever 97 is pivoted at 98 and has a series of springs 99 connected to the short end 100. The long end 101 has a link similar to the link 82 connected thereto for operating a rock shaft similar to the rock shaft 87 to apply brakes to a second set of wheels, one of which is indicated by the numeral 102.

From the above description it will be seen that as the brake operating lever 58 is moved from the position of the released brakes of Fig. 1 to the left, that is, to a position for applying the brakes, that the crosshead is thrust outwardly, the spring motor rotates the sleeve 16 in such a direction that the adjustable wedging arm 36 exerts a thrust on the roller 56 and the pin, thus exerting a force to move the crosshead outwardly and to apply the brakes. In this action the springs of the motor, which have been placed under tension when the brakes are released, are allowed to slacken and thus effect this movement. On account of the leverage which may be obtained through the medium of the operating lever 59, the crosshead may be held in any desired position from the brakes fully released to that of a full, tight application of the brakes, or at any intermediate place. Therefore, the brakes can be applied and held applied with the desired pressure.

In the construction illustrated in Fig. 9, I illustrate an automobile construction having a frame or chassis 105 on which is mounted the bed plate 12 and the box structure 26 containing the crosshead. The operating lever is extended and indicated by the numeral 106, this passing up through a slot 107 in the floor board 108 of the vehicle and having a hand grip end 109. The crosshead has a pair of links 110 connected thereto which lead to a bell crank 111, such bell crank being connected to a rock shaft 112. The long arm 113 of this bell crank has a pin and slot connection 114 to the link 110 and is normally retracted by the retraction spring 115 connected to the end of the long arm and to the fixed part of the vehicle frame. A first brake applying arm 116 has a pin and slot connection 117 to brake rods 118. A retraction spring 119 is connected between the end of this arm and a fixed part of the vehicle. The brake rod 118 operates a brake band through the medium of a short lever 120, which is pivoted on a lug 121 on the brake band 122, and the opposite end of the brake band is connected by a link 123 to the lever 120. The band applies pressure on the brake drum 124, this band being illustrated on the rear wheels. For applying the brakes to the front wheels of the vehicle an additional arm 125 is connected to the rock shaft 112, this rock shaft being journaled in any suitable manner to the frame of the vehicle, and connected to this arm there is a brake rod 126 connected to the arm 125 by a pin and slot connection 127. The driver may be seated on the seat 128' and can, therefore, conveniently manipulate the hand lever 106 for applying and releasing the brakes and holding the brakes at any desired degree of application.

In Fig. 10 I have illustrated a modified construction for use in an automobile in which the box structure 26 is reversed in position and a foot pedal 128 is provided. This foot pedal has a toe cap 129 which may be engaged by a person's toe for pulling the device to the right of Fig. 10. Links 130 connect to a rocking lever 131, which lever is connected to a rock shaft 132, which is supported in any suitable manner. This rock shaft has an arm 133 thereon which may be formed integral with the lever 131, and from this there is a brake applying rod 134. A second set of arms 135 on the rock shaft 132 has brake applying rods 136. These rods, therefore, apply the brakes at both the front and the rear of the vehicle. A strong retraction spring 137 is connected to the arm 135 and to a fixed point on the vehicle, and a smaller brake release spring 138 is connected to the opposite side of this arm and to a fixed point on the vehicle. By this construction it will be seen that the brakes may be applied by pressing down on the foot pedal in a normal way and may be held at any degree of application, and in order to release the brakes and at the same time tension the springs of the main motor, the foot pedal is pulled upwardly by the toe cap 129.

In Figs. 1 and 11 I have illustrated an air power control mechanism for operating the lever 58. The construction of the air mechanism is substantially the same as in my Patent 1,680,533 for air brake apparatus, patented August 14, 1928. The only changes are that the shaft 139 of the control valve has a coiled spring 140 thereon, which spring has one end secured to the shaft and the other end to the housing so that the spring is normally tensioned to close the valve, the closed position of the valve being illustrated in Fig. 1; also instead of using a pocket valve as the air release, I show a manually controlled valve 141. By this construction a control of the air, for instance, in the train line in a railway train by release of the pressure thereof causes the brake piston in the assembly 142 to move to the left and also the piston in the control valve 143 to move to the left. The movement of the brake piston, therefore, operates the brake operating lever 58, swinging this to the left and having the same effect as the manual operation and control of this lever. By this construction, the air system is merely used to operate the lever 58 and the spring motor, together with the crosshead, and the wedging or cam arm 36 functions in the direct application of the brakes.

In order that the wedging arm 36 may be readily adjusted, a cover plate 146 is secured to one side of the boxlike structure 26. On removal of this plate the pin 37 may be readily removed and inserted in other perforations 40 to effect the adjusting of the wedge arm 36.

Various changes may be made in the details of construction without departing from the spirit or scope of the invention as defined by the appended claims.

I claim:

1. In a brake, a rotatable shaft having a spring motor to rotate such shaft, a slidable crosshead having means connected thereto to apply brakes, means to initiate a sliding action for application of the brakes, and means interacting between the shaft and the crosshead to urge said crosshead into brake applying position.

2. In a brake as claimed in claim 1, the means to initiate the movement of the crosshead being mounted for returning the crosshead to its original position, and said interacting means being operative to rotate the shaft in a reverse direction and thereby tension the springs of the motor on release of the brake.

3. In a brake, a slidable crosshead having means connected thereto for applying and releasing brakes, means to control the reciprocation of said crosshead, a rotatable shaft having a spring motor connected thereto to rotate said shaft, an interacting means between the shaft and the crosshead to urge said crosshead to a brake applying position in reciprocation of the crosshead in one direction, the reciprocation of the crosshead in the opposite direction for releasing the brakes causing said interacting means to rotate the shaft for tensioning the springs of the motor.

4. In a brake, a slidable crosshead having means connected thereto for applying and releasing brakes, a rotatable shaft having a spring motor connected thereto, a wedging arm connected to said shaft, a roller on the crosshead engaged by said arm, means to initiate a sliding movement of the crosshead for applying the brakes, said shaft being rotatable by the spring, and said arm exerting a pressure on the roller to shift the crosshead in the same direction.

5. In a brake as claimed in claim 4, the means for urging the crosshead for applying the brakes having a connection therewith for returning the crosshead to its original position for release of the brakes, and said roller being adapted to rotate the wedging arm and the shaft of the motor to tension the springs of such motor.

6. In a brake, a slidable crosshead having means connected thereto for applying brakes, a pivotally mounted lever having a connection with the crosshead to reciprocate same for applying and releasing brakes, a spring motor having a rotatable shaft, and an interacting means between the shaft and the crosshead to urge the crosshead into a brake applying position on release of the springs, said interacting means being adapted to rotate the shaft in a reverse direction for retensioning the springs on release of the brake.

7. In a brake as claimed in claim 6, said interacting means between the shaft and the crosshead being adjustably mounted on the shaft to permit changing of the relation of the interacting means and said crosshead.

8. In a brake, a slidable crosshead having means connected thereto for applying brakes, a pivotally mounted lever having a connection with the crosshead to reciprocate same for applying and releasing brakes, a spring motor having a rotatable shaft, a wedging arm connected to the shaft, a roller on the crosshead engaged by said arm, the movement of the lever to shift the crosshead in one direction being adapted to force the roller against the arm to rotate said shaft and tension the springs of a spring motor, and in the opposite movement of said lever the springs being adapted to rotate the shaft and cause the wedging arm to exert a pressure on said roller in the movement of the crosshead.

9. In a brake as claimed in claim 8, said wedging arm being adjustably mounted on the shaft whereby the wedging relation between said arm and the roller will be changed.

10. In a brake, a boxlike structure having a guideway with a crosshead slidably mounted therein, one end of the crosshead projecting beyond the end of the structure having means for applying and releasing brakes, a lever pivotally mounted in the upper part of said structure and having its lower end engaging the crosshead to reciprocate such crosshead, a rotatable shaft mounted in the lower part of the box structure and having a fixed and an adjustable wedging arm mounted thereon, an adjusting means interconnecting the fixed and the adjustable arm, a roller mounted on the crosshead and engageable by the wedging arm, one end of the shaft extending beyond the side of the box and having springs connected thereto forming a spring motor, said spring motor causing the wedging arm to exert a pressure against the roller, and the movement of the crosshead in one direction being adapted to rotate said shaft and to tension the springs of the motor, and in the opposite direction the spring motor being adapted to rotate the shaft and cause the wedging arm to exert a pressure against the roller for movement of the crosshead.

11. In a brake as claimed in claim 10, a flat base connected to the box structure and having pins at opposite ends, the springs of the motor being connected at one end to the shaft and at the other end to perforated straps, said straps being adapted to engage the pins to vary the tension of the springs.

12. In a brake, a slidable crosshead, a spring motor having a shaft, means to interconnect the shaft and the crosshead, means to move the crosshead, the movement of the crosshead in one direction exerting a turning pressure on the shaft to tension the springs thereof, said shaft in the movement of the crosshead in the opposite direction causing the interacting means to exert a pressure to move the crosshead for applying brakes, a brake and a spring operatively connected thereto, the spring of the brake having a connecting means to the crosshead whereby such brake spring becomes tensioned on applying the brakes, and such tension is released when the brakes are released.

13. In a brake, a slidable crosshead, a first spring motor having a rotatable shaft, a pressure exerting means between the shaft and the crosshead adapted to urge the crosshead in one direction for applying brakes, a control means for sliding the crosshead, a brake having a brake spring, a connection from the crosshead to the brake through said brake spring, the sliding of the crosshead in one direction increasing the tension of the springs of the spring motor and releasing the tension of the brake spring and vice versa the sliding of the crosshead in the opposite direction for applying the brakes releasing the tension of the springs of the spring motor and increasing the tension of the brake spring.

14. In a brake having a brake actuating piston with a control valve, the piston and the control valve being operated by air, the combination of a spring for returning the control valve to its closed position, a slidable crosshead, an operating connection between the piston and the crosshead to slide same in one direction, brake applying devices connected to the crosshead, a spring motor having a rotatable shaft, and an interconnecting pressure means between such shaft and the crosshead.

15. In a brake having a brake applying cylinder with a piston therein and a control valve for the movement of the piston, the combination of a spring connected to the control valve to normally close same, and a manually controlled release valve connected to the control valve, a slidable crosshead, a lever interconnecting the piston and said crosshead to reciprocate said crosshead, brake applying devices connected to the crosshead, a spring motor having a rotatable shaft, and a pressure exerting means between the shaft and the crosshead.

16. In a brake, a housing structure having a slideway with a crosshead slidable therein, a spring motor having a shaft, a wedging arm connected to the shaft, means for interengaging said arm and the crosshead, a control lever for rotating the shaft, links connected to the crosshead, a balance lever connected to the links, brake applying devices, and springs connected between the balance lever and the brake applying devices, the springs of the motor being adapted to be tensioned when the brakes are released, and the springs connected to the brake lever being adapted to be tensioned when the brakes are applied.

17. In a brake, a guide structure having a slidable crosshead, an operating lever to reciprocate said crosshead, a spring motor having a shaft, a wedging arm adjustably mounted on the shaft and having means for engaging the crosshead to force the crosshead in one direction, a balance lever, connections between the crosshead and said lever, a brake applying lever, springs between the balance and the brake applying lever, and an additional retraction spring for the brake lever, said operating lever being adapted to move the crosshead in one direction and rotate the shaft of the motor and to tension the springs of the spring motor when the brake is in the released position, the springs of the spring motor operating to force the crosshead into brake applying position and to operate the balance lever to exert a tension on the springs between such latter lever and the brake lever whereby such latter springs become tensioned when the brake is applied.

18. In a brake, a guide structure having a slidable crosshead therein, a control lever connected to reciprocate said crosshead, a spring motor having a shaft with an adjustable wedging arm connected thereto to force the crosshead into a brake applying position, said crosshead rotating the shaft and tensioning the springs when the brake is moved to the released position, a bell crank, a connection between the crosshead and one arm of the bell crank, a set of releasing springs connected to the bell crank, and means connected to the other arm of the bell crank for applying the brakes, said latter springs becoming tensioned when the brake is applied and releasing their tension on release of the brake.

19. In a brake, a guide structure having a slidable crosshead therein, a control lever having a foot pedal with a toe-engaging means whereby said pedal may be moved in both directions, a spring motor having a shaft with an adjustable wedging arm into engagement with the crosshead to move the crosshead into brake applying position, said crosshead when moved to the brake releasing position rotating the shaft and tensioning the springs, a rocking lever having one end connected by links to the crosshead and the other end connected to brakes, retraction springs connected to said lever, said retraction springs becoming tensioned on applying the brakes and releasing their tension on releasing the brakes.

20. In a brake, a spring motor having a base plate with adjusting pins at opposite ends, a shaft journaled in the base plate and having springs connected thereto and extending in opposite directions, said springs having perforated straps at the ends to engage the adjusted pins, a slidable crosshead, a wedging arm on the shaft and having an interengaging means with the crosshead to force the crosshead in one direction, and a brake applying connecting means attached to the crosshead.

In testimony whereof I have signed my name to this specification.

C. I. FRANTZ.